March 21, 1933.   R. LAVANDEIRA   1,902,370
SUPPORTING FRAME FOR WINDING MECHANISM
Filed Dec. 6, 1930   5 Sheets-Sheet 1
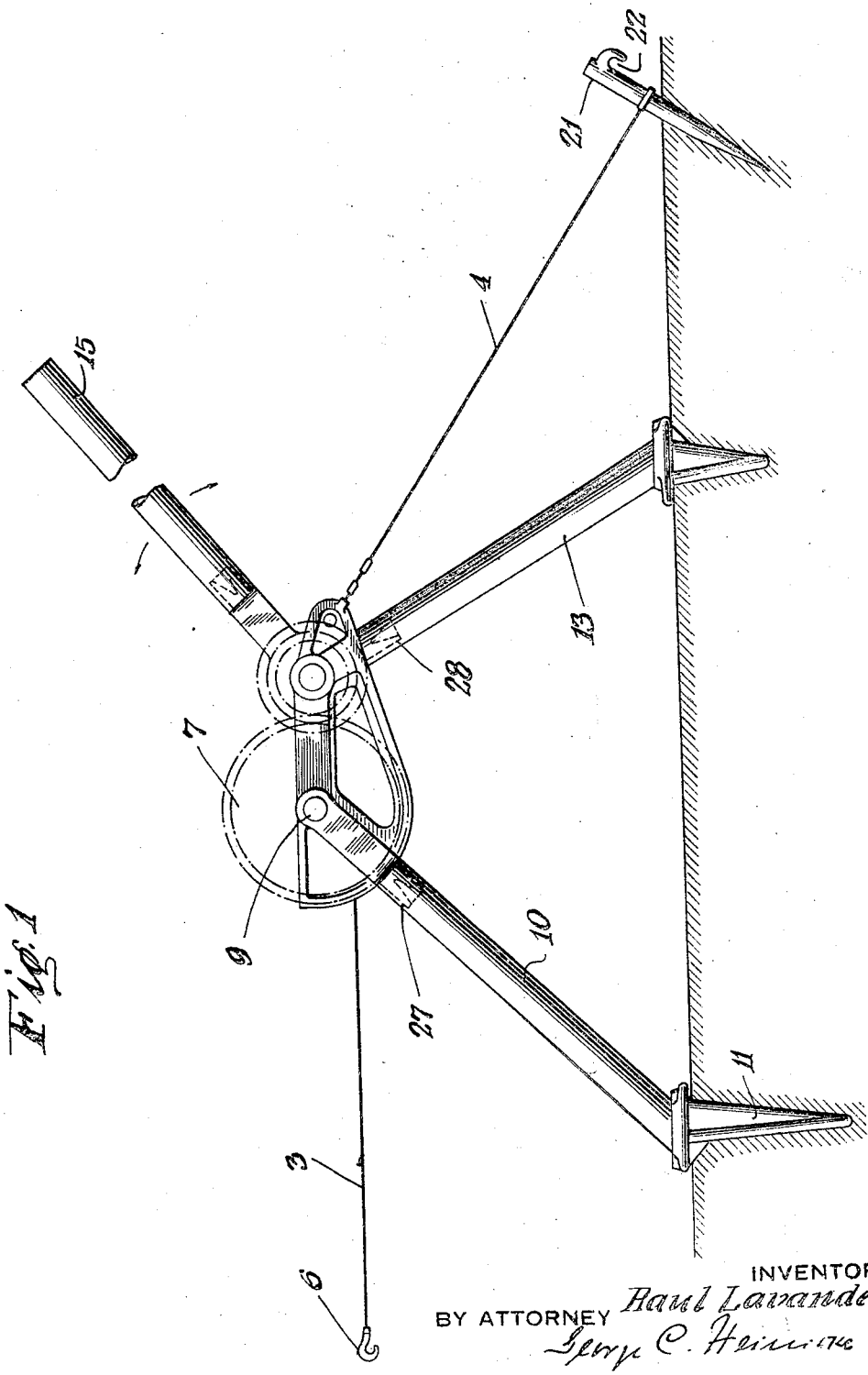
INVENTOR
Raul Lavandeira
BY ATTORNEY
George C. Heinrich March 21, 1933. R. LAVANDEIRA 1,902,370
SUPPORTING FRAME FOR WINDING MECHANISM
Filed Dec. 6, 1930 5 Sheets-Sheet 2
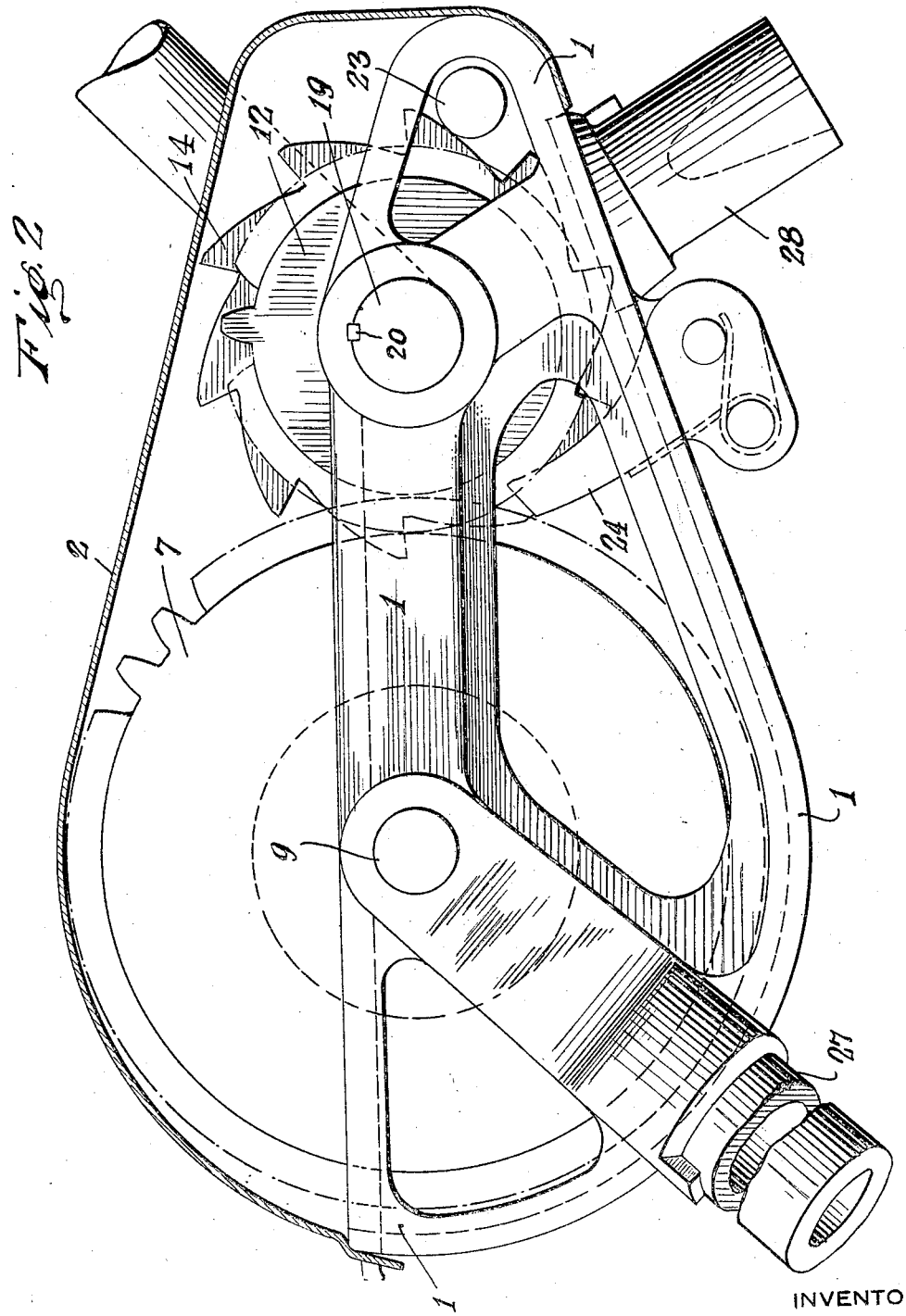
INVENTOR
Raul Lavandeira
BY ATTORNEY March 21, 1933.   R. LAVANDEIRA   1,902,370
SUPPORTING FRAME FOR WINDING MECHANISM
Filed Dec. 6, 1930   5 Sheets-Sheet 3
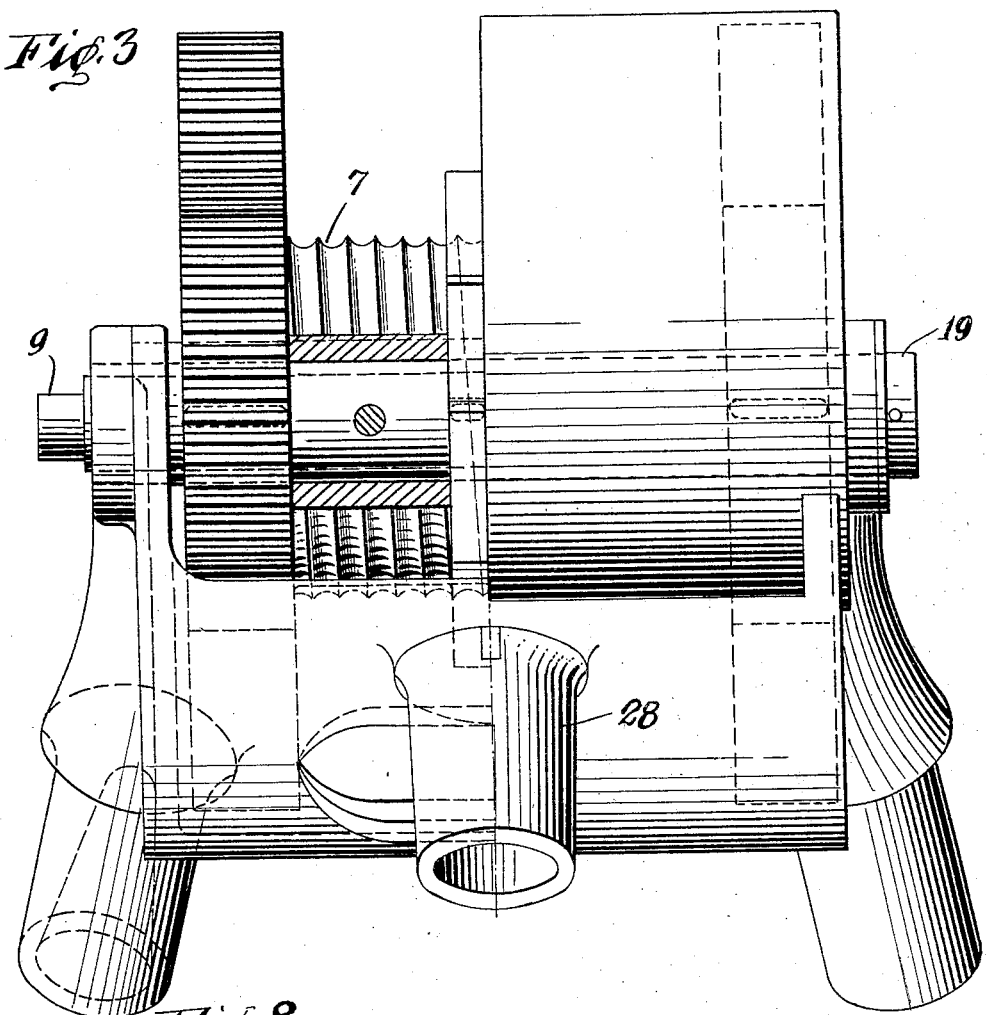
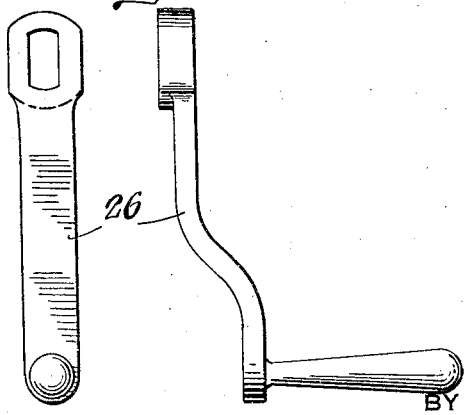
Raul Lavandeira
INVENTOR
BY ATTORNEY March 21, 1933. R. LAVANDEIRA 1,902,370
SUPPORTING FRAME FOR WINDING MECHANISM
Filed Dec. 6, 1930 5 Sheets-Sheet 4
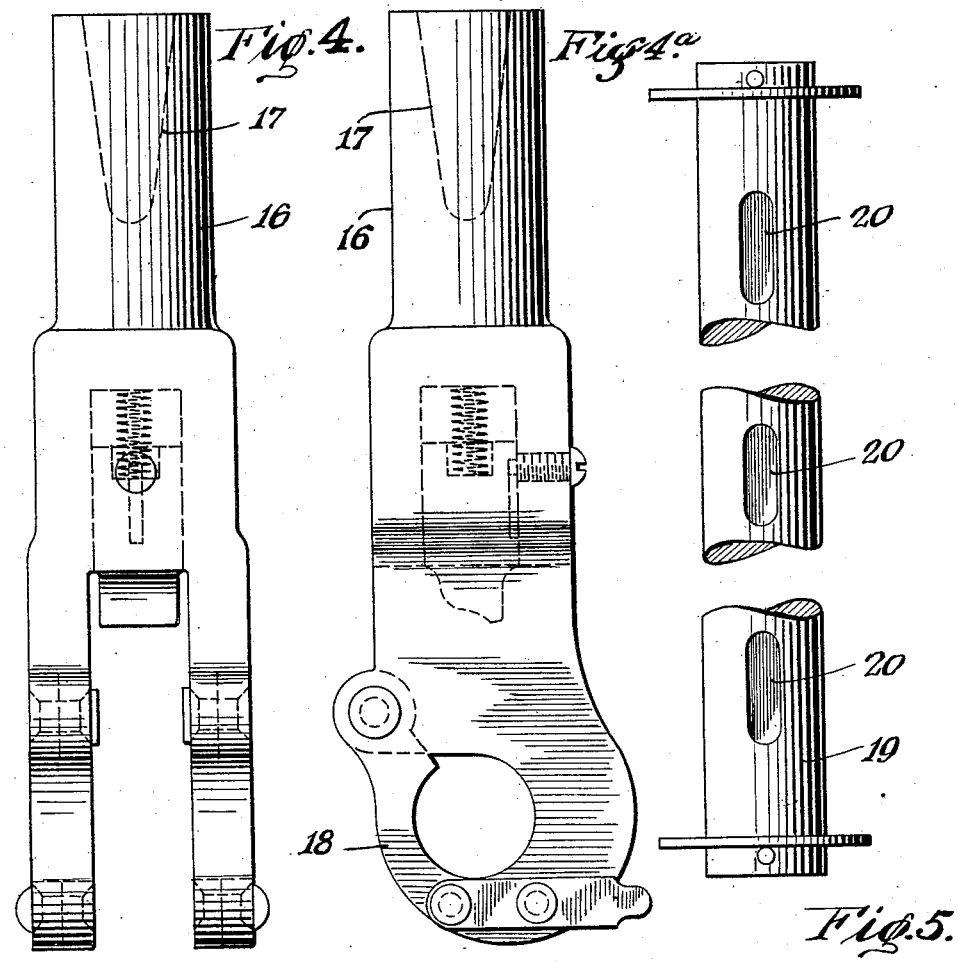
Raul Lavandeira
INVENTOR
BY ATTORNEY

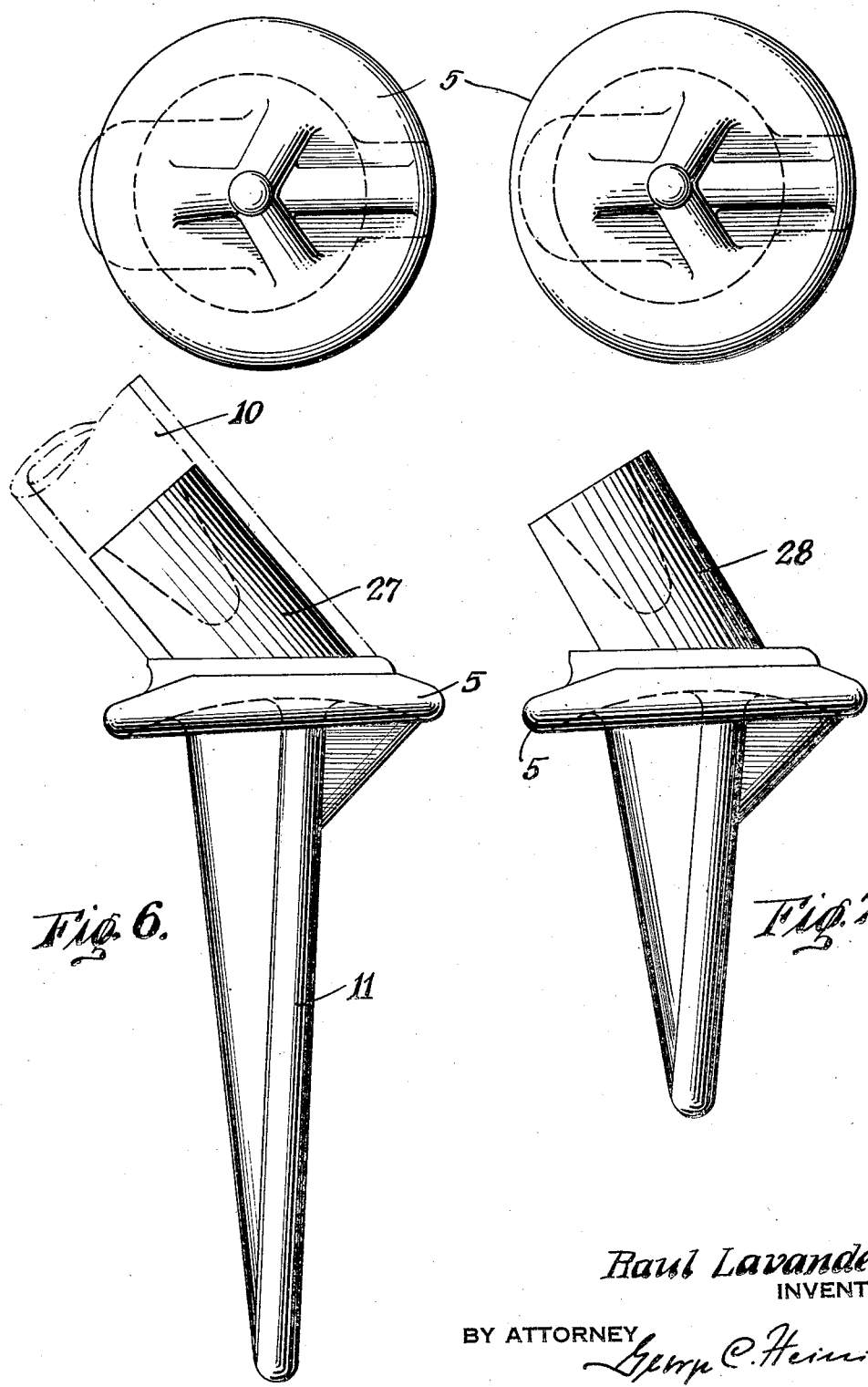

Patented Mar. 21, 1933

1,902,370

UNITED STATES PATENT OFFICE

RAUL LAVANDEIRA, OF BUENOS AIRES, ARGENTINA

SUPPORTING FRAME FOR WINDING MECHANISM

Application filed December 6, 1930, Serial No. 500,530, and in Argentina August 22, 1930.

This invention refers to a motor vehicle pulling apparatus mounted on a detachable tripod which is operated by hand and independent of the motor of the vehicle.

Reference is made to the accompanying drawings in which:

Figure 1 is a side view of the complete apparatus mounted on a tripod and ready to operate after being coupled to the vehicle.

Figure 2 is a side view of the casing containing the mechanism but without the operating lever, a detachable cover therefor being shown in section.

Figure 3 is a front view of the casing showing the interior mechanism and showing the cover placed in position on its rear part.

Figure 4 is a front view of the operating lever.

Figure 4a is a side view thereof.

Figure 5 is a view of the axle on which the lever rotates and to which are fixed the pinions and ratchet wheel.

Figure 6 is a view of the spike of the front legs of the tripod.

Figure 7 is a view of the rear leg of the tripod.

Figure 8 is a view of the detachable supplementary lever on the axle of the drum.

The invention consists of a casing 1, Figures 1, and 2, which is cast in one block from any known metal.

The casing 1 is provided with two bushings in which are journalled the axles 9 and 19. The axle 9 carries a drum 7 provided with spiral grooves and gears and which are preferably cast in one block of a material similar to the material of the casing 1 and resistant to friction and flexion. This drum is fixed to the axle 9 by means of a key.

In the spiral grooves of drum 7 is wound the tractive cable 3, the end of which is provided with a hook to be fastened to the vehicle which is to be hauled out of the mire. The length of this tractive cable 3 depends on the prevailing requirements and it may be provided with coupling rings at convenient intervals in order to reduce or increase the length.

The casing 1 is formed with downwardly and inclined lugs 27 and 28 having sockets therein in which are positioned the upper ends of legs 10 and 13 which support the casing. On the axle 19 the double pinion 12 actuates and operates the gear and drum 7 and the ratchet wheel 14 which by means of the lever 15 operates the said double pinion 12. These parts, the double pinion 12 and ratchet wheel 14 are fixed on the axle 19 by means of wedges placed in the sockets 20.

A pawl 24 is pivotally mounted on the casing and spring pressed into engagement with the teeth of the ratchet wheel 14 to prevent retrograde movement thereof.

The back end of the casing 1 is provided with two holes 23 in which the stays 4 may be attached.

The spike ends 11 of the front legs 10 are each provided with a concave disc 5 to act as a support and to limit the penetration of the spike in the ground.

The rear leg 13 is similar in construction to the legs already described.

On the axle 9 of the drum 7, the supplementary detachable lever 26 operates in order to wind the cable more rapidly on the spiral grooves of the said drum 7.

In order to disconnect the holding pawl 24, and allow a backward movement a key is provided.

The lever 15, which is designed to operate the device by means of a simple oscillating movement given by the person who wishes to haul the vehicle, is composed of two parts: the head and lever.

The head of the lever shown in Figures 4 and 4a, has a stem socket 16 provided with the cavity 17 as shown in dotted lines in the said figures.

The hooked shaped device 18 is articulated and fits around the axle 19.

In the stem socket 16 the lever 15 is introduced, which should be constructed of laminated piping or otherwise and made of metal similar to that used for the casing 1, resistant to the flexion to which it is submitted.

The device as described is also supplied with the pegs 21 of any suitable form in order that they may be pulled out of the ground after having served their purpose.

These pegs 21, Figure 1, are provided in their upper portion with a ridge of semi-annular form in order to leave a space 22 in which the lever 15 after removal from its socket or any other similar device may be engaged to rotate the pegs when it is necessary to readily pull them up. These pegs serve to hold the stays 4 which may be attached in the holes 23 of the casing 1.

The apparatus is carried dismounted in the vehicle; when the latter is detained by being stuck in a mud hole, soft clay or sand, in the bed of a stream or in a ditch or cannot go up a grade owing to its steepness, the apparatus is mounted (in front or in the rear of the vehicle at a convenient distance from same) on the tripod, the spikes 11 of the legs resting on the surface of the ground. The pegs 21 are introduced in the ground and the stays 4 are placed in position without exerting too much stress. The lever 15 is fixed into its socket and the cable 3 is unwound from the drum 7 until it can be fastened to the vehicle by means of the hook 6.

The lever 15 owing to the oscillating movement given to it operates the pinion 12 which in turn will operate the gear and drum 7 on which the cable 3 is wound. Whilst the cable 3 is wound on the drum, two opposite forces are created on the cable 3, one from the apparatus to the vehicle and the other from the latter to the former.

By means of this system, when the cables 3 and 4 are stretched and the pegs 11 of the legs 10 have entered the ground the apparatus is firmly anchored to the ground and rests on three points hauling the vehicle towards it, which is exactly what is required.

Having thus described my invention and the way in which same is to be worked, what I claim as new and wish to protect by Letters Patent is:—

A supporting frame for a winding mechanism to pull vehicles from swampy ground comprising a casting supporting the winding mechanism, said casting being formed with sockets, legs having their upper ends secured in said sockets, spikes secured to the lower ends of the legs and positioned at an angle thereto, concave discs securing the spikes to the legs and having a surface adapted to rest on the surface of the ground, a peg adapted to be driven into the ground at a suitable distance from said spikes, and a stay connecting said peg to said casting, said peg and spike being relatively so arranged as to overcome the resistance of the vehicle.

In testimony whereof, I affirm my signature.

RAUL LAVANDEIRA.